United States Patent [19]

Tajima et al.

[11] Patent Number: 4,619,981

[45] Date of Patent: Oct. 28, 1986

[54] PROCESS FOR PREPARING POLYOLEFINS

[75] Inventors: Yoshio Tajima; Yoshiharu Iwasaki, both of Tokyo; Kiyoshi Kawabe; Wataru Uchida, both of Yokohama; Shoji Sugita, Kawasaki; Kazuo Matsuura, Tokyo; Mituji Miyoshi, Fujisawa, all of Japan

[73] Assignee: Nippon Oil Company, Limited, Tokyo, Japan

[21] Appl. No.: 764,528

[22] Filed: Aug. 12, 1985

Related U.S. Application Data

[63] Continuation of Ser. No. 634,387, Jul. 25, 1984, abandoned.

[30] Foreign Application Priority Data

Jul. 29, 1983 [JP] Japan ................. 58-137572

[51] Int. Cl.$^4$ ............... C08F 4/02; C08F 10/06
[52] U.S. Cl. ......................... 526/125; 502/125; 502/126; 502/134; 526/128; 526/351; 526/906
[58] Field of Search ................ 526/125, 634, 387

[56] References Cited

U.S. PATENT DOCUMENTS

| | | | |
|---|---|---|---|
| 4,085,276 | 4/1978 | Toyota et al. | 526/125 |
| 4,143,223 | 3/1979 | Toyota et al. | 526/125 |
| 4,220,554 | 9/1980 | Scata et al. | 526/125 |
| 4,263,169 | 4/1981 | Scata et al. | 526/125 |
| 4,287,328 | 9/1981 | Kikuta et al. | 526/125 |
| 4,321,345 | 3/1982 | Sato et al. | 526/125 |
| 4,328,122 | 5/1982 | Monte et al. | 526/125 |
| 4,354,959 | 10/1982 | Epstein et al. | 526/125 |
| 4,396,534 | 8/1983 | Matsuura et al. | 526/125 |
| 4,451,688 | 5/1984 | Kuroda et al. | 526/125 |
| 4,525,555 | 6/1985 | Tajima et al. | 526/125 |

FOREIGN PATENT DOCUMENTS

| | | | |
|---|---|---|---|
| 45975 | 2/1982 | European Pat. Off. | 526/128 |
| 2040967 | 9/1980 | United Kingdom | 526/125 |

*Primary Examiner*—Edward J. Smith
*Attorney, Agent, or Firm*—Stevens, Davis, Miller & Mosher

[57] ABSTRACT

Provided is an olefin polymerization catalyst comprising the combination of:
[I] a solid catalyst component comprising a solid material obtained by contacting the following components (1) to (4) and a titanium compound (5) supported on said solid material:
(1) a magnesium halide,
(2) a compound represented by the general formula

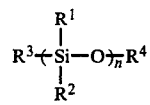

wherein $R^1$, $R^2$ and $R^3$ are each a hydrocarbon radical having 1 to 24 carbon atoms, alkoxy, hydrogen, or halogen, $R^4$ is a hydrocarbon radical having 1 to 24 carbon atoms and n is $1 \leq n \leq 30$,
(3) a compound represented by the general formula

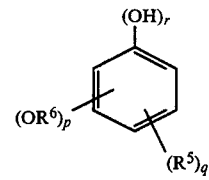

wherein $R^5$ is hydrogen, halogen, or a hydrocarbon radical having 1 to 24 carbon atoms, R6 is a hydrocarbon radical having 1 to 24 carbon atoms, and r, p and q are integers selected from the following ranges: $1 \leq r \leq 3$, $0 \leq p < 6$, $0 \leq q < 6$, provided $1 \leq r + p + q < 6$, and
(4) a compound represented by the general formula $R^7\text{-O-}R^8$ wherein $R^7$ and $R^8$ are each a hydrocarbon radical having 1 to 24 carbon atoms;
[II] an organometallic compound; and
[III] a compound represented by the general formula

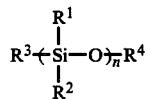

wherein $R^1$, $R^2$ and $R^3$ are each a hydrocarbon radical having 1 to 24 carbon atoms, alkoxy, hydrogen, or halogen, $R^4$ is a hydrocarbon radical having 1 to 24 carbon atoms and n is $1 \leq n \leq 30$.

3 Claims, No Drawings

PROCESS FOR PREPARING POLYOLEFINS

This application is a Continuation of application Ser. No. 634,387, filed July 25, 1984, now abandoned.

BACKGROUND OF THE INVENTION

The present invention relates to a process for polymerizing or copolymerizing α-olefins in high activity and high stereospecificity using a novel catalyst.

Catalysts comprising titanium halides and organoaluminum compounds have heretofore been known as catalysts for polymerizing α-olefins in high stereospecificity. In the polymerization using such catalysts, however, the catalysts remain in considerable amounts in the resultant polymers because of low catalytic activity, so it is necessary to remove the residual catalysts, although there are obtained highly stereo-specific polymers.

Recently, various proposals have been made for improving the catalytic activity. According to these proposals, a high activity catalyst is obtained by using a catalyst component comprising an inorganic solid carrier such as MgCl$_2$ and titanium tetrachloride supported thereon.

In the preparation of polyolefins, however, it is preferable that the catalytic activity be as high as possible, and so a catalyst of higher activity has been demanded. It is also important that the proportion of atactic portion in the resultant polymer be as small as possible.

In the above proposed methods, olefin polymers are usually obtained in a state of slurry, but from the standpoint of utilization efficiency of the reaction vessel, the higher the bulk density of the resultant olefin polymers, the more advantageous.

SUMMARY OF THE INVENTION

It is the object of the present invention to provide a process for preparing highly stereospecific polyolefins of a high bulk density in an extremely high activity using a novel catalyst.

The present invention resides in a process for preparing a highly stereospecific polyolefin in an extremely high activity by polymerizing at least one α-olefin using a catalyst, which catalyst comprises the combination of:

[I] a solid catalyst component comprising a solid material obtained by contacting the following components (1) to (4) and a titanium compound (5) supported on the solid material:
  (1) a magnesium halide,
  (2) a compound represented by the general formula

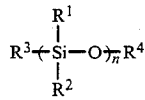

wherein R$^1$, R$^2$ and R$^3$ are each a hydrocarbon radical having 1 to 24 carbon atoms, alkoxy, hydrogen, or halogen, R$^4$ is a hydrocarbon radical having 1 to 24 carbon atoms and n is $1 \leq n \leq 30$,
  (3) a compound represented by the general formula

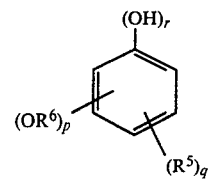

wherein R$^5$ is hydrogen, halogen, or a hydrocarbon radical having 1 to 24 carbon atoms, R$^6$ is a hydrocarbon radical having 1 to 24 carbon atoms, and r, p and q are integers selected from the following ranges: $1 \leq r \leq 3$, $0 \leq p < 6$, provided $1 \leq r+p+q < 6$, and
  (4) a compound represented by the general formula R$^7$-O-R$^8$ wherein R$^7$ and R$^8$ are each a hydrocarbon radical having 1 to 24 carbon atoms;

[II] an organometallic compound; and

[III] a compound represented by the general formula

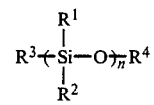

wherein R$^1$, R$^2$ and R$^3$ are each a hydrocarbon radical having 1 to 24 carbon atoms, alkoxy, hydrogen, or halogen, R$^4$ is a hydrocarbon radical having 1 to 24 carbon atoms and n is $1 \leq n \leq 30$.

By using the catalyst of the present invention there can be obtained various effects. For example, the partial pressure of monomer during polymerization is low and the amount of catalyst remaining in the resultant polymer is extremely small in a short-time polymerization, and consequently the polyolefin manufacturing process can be carried out without the need of going through the catalyst removing step. Besides, the proportion of atactic portion in the resultant polymer is extremely small, and the bulk density of the resultant polymer is high.

DESCRIPTION OF THE PREFERRED EMBODIMENTS

The method of obtaining the solid material used in the invention by contacting the following components (1) to (4) is not specially limited: (1) a magnesium halide, (2) a compound of the general formula

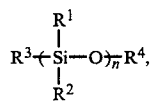

(3) a compound of the general formula

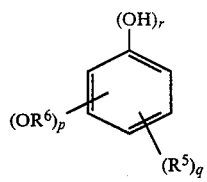

and (4) a compound of the general formula R$^7$-O-R$^8$. For example, these components may be reacted by contacting them under heating at a temperature of 20° to 400° C., preferably 50° to 300° C., for 5 minutes to 20 hours in the presence or absence of an inert solvent; or they may be reacted by a co-pulverization treatment, or may be reacted under a suitable combination of these methods.

The order of reaction of the components (1) to (4) is not specially limited, either.

In the case of using an inert solvent in the reaction, the inert solvent is not specially limited and usually there may be employed a hydrocarbon and/or a derivative thereof not inactivating Ziegler type catalysts. Examples are aliphatic saturated hydrocarbons, aromatic and alicyclic hydrocarbons, such as propane, butane, pentane, hexane, heptane, octane, benzene, toluene, xylene and cyclohexane, as well as alcohols and esters such as ethanol, ethyl acetate and ethyl benzoate.

The co-pulverization treatment is carried out usually by means of a ball mill, a vibration mill, a rod mill, or an impact mill, at a temperature of 0° to 200° C., preferably 20° to 100° C., for 0.5 to 100 hours.

Preferably, the solid material used in the invention is obtained by the co-pulverization treatment of the components (1) to (4).

The ratio of component (1), i.e., a magnesium halide, to component (2), i.e., a compound of the general formula

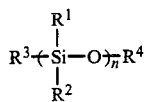

is 1:0.001~10, preferably 1:0.01~1, in terms of component (1) : component (2) mole ratio. The proportion of component (3), i.e., a compound of the general formula

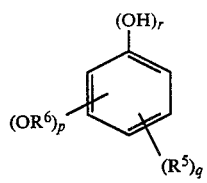

is 1:0.001~10, preferably 1:0.01~1, in terms of component (1) : component (3) mole ratio. The proportion of component (4), i.e., a compound of the general formula $R^7$-O-$R^8$, is 1:0.001~10, preferably 1:0.005~0.5, most preferably 1:0.01~0.25, in terms of component (1) : component (4) mole ratio. It is preferable that the components (1) to (4) be used in these proportions; otherwise, it would be impossible to expect superior effects in activity, stereospecificity and bulk density.

By supporting a titanium compound on the solid carrier thus prepared, there is obtained the solid catalyst component [I].

A known method may be used for supporting a titanium compound on the solid carrier. For example, the solid carrier may be contacted with an excess titanium compound under heating in the presence or absence of a solvent. Preferably and conveniently, both are heated to a temperature in the range of 50° to 300° C., preferably 80° to 150° C., in the presence of a solvent, e.g. 1,2-dichloroethane. The reaction time is not specially limited, but usually it is not shorter than 5 minutes. A long-time contact may be done though it is not necessary. For example, the duration of the treatment is in the range of 5 minutes to 10 hours, preferably 1 to 4 hours. Of course, this treatment should be performed in an oxygen- and water-free inert gas atmosphere. The means for removing unreacted titanium compound after completion of the reaction is not specially limited. For example, the reaction mixture may be washed several times with a solvent inert to Ziegler type catalysts followed by evaporation of the washings under reduced pressure to obtain a solid powder. Alternatively, the solid carrier and a required amount of a titanium compound may be co-pulverized.

Usually, the co-pulverization is performed at a temperature of 0° to 200° C., preferably 20° to 100° C., for 0.5 to 30 hours, whereby the solid catalyst component used in the invention can be prepared. Of course, the co-pulverizing operation should be performed in an inert gas atmosphere, and moisture should be avoided.

The magnesium halide used in the invention is substantially anhydrous, examples of which are magnesium fluoride, magnesium chloride, magnesium bromide, magnesium iodide, and mixtures thereof, with magnesium chloride being particularly preferred.

As examples of the compound of the general formula

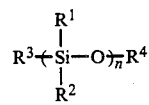

used in the invention wherein $R^1$, $R^2$ and $R^3$ are each a hydrocarbon radical having 1 to 24, preferably 1 to 18, carbon atoms, alkoxy, hydrogen, or halogen, $R^4$ is a hydrocarbon radical having 1 to 24, preferably 1 to 18, carbon atoms and n is $1 \leq n \leq 30$, mention may be made of the following: monomethyltrimethoxysilane, monoethyltrimethoxysilane, monophenyltrimethoxysilane, monomethyltriethoxysilane, monomethyltri-n-butoxysilane, monomethyltri-secbutoxysilane, monomethyltriisopropoxysilane, monomethyltripentoxysilane, monomethyltrioctoxysilane, monomethyltristearoxysilane, monomethyltriphenoxysilane, dimethyldimethoxysilane, dimethyldiethoxysilane, dimethyldiisopropoxysilane, dimethyldiphenoxysilane, trimethylmonomethoxysilane, trimethylmonoethoxysilane, trimethylmonoisopropoxysilane, trimethylmonophenoxysilane, monomethyldimethoxymonochlorosilane, monomethyldiethoxymonochlorosilane, monomethylmonoethoxydichlorosilane, monomethyldiethoxymonobromosilane, monomethyldiphenoxymonochlorosilane, dimethylmonoethoxymonochlorosilane, monoethyltriethoxysilane, monoethyltriisopropoxysilane, monoethyltriphenoxysilane, diethyldimethoxysilane, diethyldiethoxysilane, diethyldiphenoxysilane, triethylmonomethoxysilane, triethylmonoethoxysilane, triethylmonophenoxysilane, monoethyldimethoxymonochlorosilane, monoethyldiethoxymonochlorosilane, monoethyldiphenoxymonochlorosilane, monoisopropyltrimethoxysilane, mono-n-butyltrimethoxysilane, mono-n-butyltriethoxysilane, mono-sec-butyltriethoxysilane, monophenyltriethoxysilane, diphenyldiethoxysilane, diphenylmonoethoxymonochlorosilane, monomethoxytrichlorosilane, monoethoxytrichlorosilane, monoisopropoxytrichlorosilane, mono-n-butoxytrichlorosilane, monopentoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, tetraisopropoxysilane, vinyltriethoxysilane, vinyltrimethoxysilane, vinyldimethoxymonochlorosilane, vinyldiethoxymonochlorosilane, vinylmethoxydichlorosilane, vinylethoxydichlorosilane, allyltrimethoxysilane, allyltriethoxysilane, allyldimethoxymonochlorosilane, allyldiethoxymonochlorosilane, allylmethoxydichlorosilane, allylethoxydichlorosilane, vinyltriphenoxysilane, vinylethoxydiphenoxysilane, allyltriphenoxysilane, allylethoxydiphenoxysilane, as well as chain or cyclic polysiloxanes obtained by condensation of the compounds just exemplified above and having a repeating unit represented by the formula

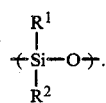

Mixtures of these compounds are also employable.

Among these compounds, as component (2) it is preferable that at least one substituent be an olefinic hydrocarbon radical. Particularly preferred are vinyltrimethoxysilane, vinyltriethoxysilane, vinyltriphenoxysilane, allyltrimethoxysilane, allyltriethoxysilane and allyltriphenoxysilane.

And as component (3) it is preferable that at least one substituent be an aromatic hydrocarbon radical, with monophenyltrimethoxysilane and monophenyltriethoxysilane being particularly preferred.

As examples of the compound of the general formula

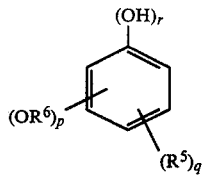

used in the invention wherein $R^5$ is hydrogen, halogen, or a hydrocarbon radical having 1 to 24, preferably 1 to 18, carbon atoms, $R^6$ is a hydrocarbon radical having 1 to 24, preferably 1 to 18, carbon atoms, and r, p and q are integers selected from the following ranges: $1 \leq r \leq 3$, $0 \leq p < 6$, $0 \leq q < 6$, provided $1 \leq r+p+q < 6$, mention may be made of the following: phenol, 1-naphthol, 2-naphthol, 2-phenanthrol, 3-phenanthrol, anthranol, methylphenol, ethylphenol, isopropylphenol, dimethylphenol, diethylphenol, dibutylphenol, trimethylphenol, triethylphenol, 2-chlorophenol, 3-bromophenol, 4-chlorophenol, 2,6-dichlorophenol, di-t-butyl-p-cresol, 2-cyclohexylphenol, 2-allylphenol, 3-hydroxystyreneisopropenylphenol, catechol, hydroquinone, 2,6-dihydroxytoluene, vinylcatechol, pyrogallol, methoxyphenol and 2-isopropoxyphenol, with phenol and 1-naphthol being particularly preferred.

As examples of the compound of the general formula $R^7-O-R^8$ used in the invention wherein $R^7$ and $R^8$ are each a hydrocarbon radical having 1 to 24, preferably 1 to 18, carbon atoms, mention may be made of the following: methyl ether, ethyl ether, propyl ether, isopropyl ether, butyl ether, isobutyl ether, n-amyl ether, isoamyl ether, methyl ethyl ether, methyl propyl ether, methyl isopropyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether, vinyl ether, allyl ether, methyl vinyl ether, methyl allyl ether, ethyl vinyl ether, ethyl allyl ether, anisole, phenetole, phenyl ether, benzyl ether, phenyl benzyl ether, 1-naphthyl ether and 2-naphthyl ether.

Among the compounds just exemplified above, those wherein at least one substituent is an aromatic hydrocarbon radical are preferred. Particularly, anisole, phenetole, phenyl ether, benzyl ether, phenyl benzyl ether, 1-naphthyl ether and 2-naphthyl ether are preferred.

Suitable examples of the titanium compound used in the invention are tetravalent and trivalent titanium compounds. As tetravalent titanium compounds, those represented by the general formula $Ti(OR)_nX_{4-n}$ are preferred wherein R is an alkyl, aryl or aralkyl group having 1 to 20 carbon atoms, X is halogen and n is $0 \leq n \leq 4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. Examples of trivalent titanium compounds are titanium trihalides obtained by reducing titanium tetrahalides such as titanium tetrachloride and titanium tetrabromide with hydrogen, aluminum, titanium or organometallic compounds of metals of Groups I–III in the Periodic Table, as well as those obtained by reducing tetravalent alkoxytitanium halides of the general formula $Ti(OR)_mX_{4-m}$ with organometallic compounds of metals of Groups I–III in the Periodic Table in which formula R is an alkyl, aryl or aralkyl group having 1 to 20 carbon atoms, X is halogen and m is $0 < m < 4$.

The amount of the titanium compound used in the invention is not specially limited. But, usually it is preferable to make adjustment so that the amount of the titanium compound contained in the solid product is in the range of 0.5 to 20 wt.%, preferably 1 to 10 wt.%.

As the organometallic compound used as component [II] in the invention there are exemplified organometallic compounds of metals of Groups I–IV in the Periodic Table which are known as one component of Ziegler type catalysts; particularly organoaluminum compounds and organozinc compounds are preferred. More concrete examples include organoaluminum compounds of the general formulae $R_3Al$, $R_2AlX$, $RAlX_2$, $R_2AlOR$, $RAl(OR)X$ and $R_3Al_2X_3$ wherein R, which may be alike or different, is an alkyl or aryl group having 1 to 20 carbon atoms and X is halogen, and organozinc compounds of the general formula $R_2Z_n$ wherein R, which may be alike or different, is an alkyl group having 1 to 20 carbon atoms, such as triethylaluminum, triisopropylaluminum, triisobutylaluminum, tri-secbutylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof.

As to the proportions of the organometallic compound as component [II] and the compound of the following general formula as component [III],

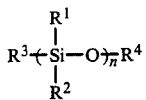

the latter is employed in an amount of usually 0.001 to 5 moles, preferably 0.01 to 2 moles, per mole of the former.

The amount of component [III] used in the invention is preferably in the range of 0.1~100:1, more preferably 0.3~20:1, in terms of Si:Ti mole ratio relative to the titanium compound contained in the solid catalyst component [I].

Both components [II] and [III] may be used as a reaction product. In this case, both are reacted in such a reaction ratio as usually 0.001 to 2 moles, preferably 0.01 to 1 mole, of component [III] per mole of component [II]. The reaction product obtained by the reaction of both components is used in an amount of 0.1~100:1, preferably 0.3~20:1, in terms of Si : Ti ratio relative to the titanium compound contained in the solid catalyst component [I].

The method of obtaining the reaction product of components [II] and [III] is not specially limited. Both components may be contacted and thereby reacted at a temperature in the range of −50° to 400° C., preferably 50° to 250° C., for 5 minutes to 20 hours in the presence or absence of an inert solvent.

The amount of the organometallic compound used in the invention is not specially limited. Usually, it may be used in an amount of 0.1 to 1,000 moles per mole of the titanium compound.

The olefin polymerizing reaction using the catalyst of the invention is performed in the same way as in conventional like reactions using Ziegler type catalysts. More particularly, the reaction is conducted in a substantially oxygen- and water-free condition, in vapor phase, or in the presence of an inert solvent, or using monomer or monomers per se as solvent. Olefin polymerizing conditions involve temperatures in the range of 20° to 200° C., preferably 40° to 180° C., and pressures in the range of atmospheric pressure to 70 kg/cm$^2$.G, preferably 2 to 60 kg/cm$^2$.G. Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there may be performed without any trouble two or more multi-stage polymerization reactions involving different polymerization conditions such as different hydrogen concentrations and different polymerization temperatures.

The process of the present invention is applicable to the polymerization of all olefins that are polymerizable in the presence of a Ziegler type catalyst, for example, homopolymerization of α-olefins such as ethylene, propylene, butene-1 and 4-methylpentene-1, as well as random and block copolymerizations of ethylene and propylene, ethylene and butene-1, and propylene and butene-1. Copolymerization with dienes for the purpose of modification of polyolefins is also preferable, for example, ethylene and butadiene, and ethylene and 1,4-hexadiene.

The process of the present invention is effective particularly for polymerizing or copolymerizing C$_3$ to C$_8$ α-olefins in high stereospecificity.

The following examples are given to further illustrate the present invention, but it is to be understood that the invention is not limited thereto.

EXAMPLE 1

(a) Preparation of Solid Catalyst Component [I]

10 g. (105 mmole) of anhydrous magnesium chloride, 4.56 g. (24 mmole) of vinyltriethoxysilane and 1.51 g. (16 mmole) of phenol were placed in a stainless steel pot having an internal volume of 400 ml. and containing 25 stainless steel balls each ½ inch in diameter, and ball-milled for 6 hours at room temperature in a nitrogen atmosphere. Thereafter, 0.68 g. (4 mmole) phenyl ether was added, followed by further ball milling for 16 hours at room temperature in a nitrogen atmosphere. Then, 5 g. of the resultant solid powder and 20 ml. of titanium tetrachloride were charged into a 200 ml. round bottom flask and stirred at 100° C. for 2 hours in a nitrogen atmosphere. After subsequent removal of excess titanium tetrachloride, the reaction mixture was washed with hexane to remove unreacted titanium tetrachloride, followed by drying under reduced pressure to obtain a solid catalyst component [I] containing 21 mg. of titanium per gram thereof.

(b) Polymerization

A 3-liter stainless steel autoclave equipped with an induction stirrer was purged with nitrogen and then charged with 1,500 ml. of hexane. Then, 2.5 mmole of triethylaluminum, 1.4 mmole of phenyltriethoxysilane and 20 mg. of the above solid catalyst component [I] were added and hydrogen was introduced so as to give a partial pressure thereof in vapor phase of 0.05 kg/cm$^2$, then the temperature was raised to 70° C. under stirring. The system was pressurized to 1.0 kg/cm$^2$.G by the vapor pressure of hexane. Then, propylene was introduced to a total pressure of 7 kg/cm$^2$.G to start polymerization, which was continued for 1 hour while introducing propylene continuously to maintain the total pressure at 7 kg/cm$^2$.G.

Thereafter, excess propylene was discharged, followed by cooling, then the contents were taken out and dried to afford 125 g. of a white polypropylene. This amount is a total amount of product including amorphous one. Catalytic activity was 1040g. polypropylene/g.solid.hr.C$_3$H$_6$ pressure, 50.0kg. polypropylene/g.Ti hr.C$_3$H$_6$ pressure. The percent residue (hereinafter referred to as "Total II") of all polymer including solvent-soluble polymer after extraction in boiling n-heptane was 98.0 wt.%. Melt flow index (hereinafter referred to as "MFI") was 7.8, and bulk density was 0.42 g/cm$^3$.

As compared with Comparative Examples 1, 2 and 3, both catalytic activity and Total II were high, and bulk density was also high.

COMPARATIVE EXAMPLE 1

A solid catalyst component was prepared in the same way as in Example 1 except that vinyltriethoxysilane was not used. Then, using this solid catalyst component, polymerization was conducted in the same manner as in Example 1 to afford 75 g. of polypropylene. Catalytic activity was 625g. polypropylene/g.solid.hr.$C_3H_6$ pressure. Total II and MFI were 84.0 wt.% and 8.3, respectively, and bulk density was 0.32 g/cm$^3$.

COMPARATIVE EXAMPLE 2

A solid catalyst component was prepared in the same way as in Example 1 except that phenol was not used. Then, using this solid catalyst component, polymerization was conducted in the same manner as in Example 1 to afford 24 g. of polypropylene. Catalytic activity was 200g.polypropylene/g.solid.hr.$C_3H_6$ pressure. Total II and MFI were 90.2 wt.% and 7.0, respectively, and bulk density was 0.33 g/cm$^3$.

COMPARATIVE EXAMPLE 3

A solid catalyst component was prepared in the same way as in Example 1 except that phenyl ether was not used. Then, using this solid catalyst component, polymerization was conducted in the same manner as in Example 1 to afford 98 g. of polypropylene. Catalytic activity was 817g.polypropylene/g.solid.hr $C_3H_6$ pressure. Total II and MFI were 97.2 wt.% and 8.0, respectively, and bulk density was 0.30 g/cm$^3$.

EXAMPLES 2-10

Using such compounds as shown in Table 1, solid catalyst components were prepared in the same way as in Example 1. Then, using these solid catalyst components, polymerization of propylene was performed in the same manner as in Example 1, results of which are as set out in Table 1.

EXAMPLE 11

A solid catalyst component was prepared in the same way as in Example 1 except that allyltriethoxysilane was used in place of vinyltriethoxysilane. Then, using this solid catalyst component, polymerization was performed in the same manner as in Example 1, results of which are as set out in Table 1.

EXAMPLE 12

A solid catalyst component was prepared in the same way as in Example 1 except that 1-naphthol was used in place of phenol. Then, using this solid catalyst component, polymerization was performed in the same manner as in Example 1, results of which are as set out in Table 1.

EXAMPLE 13

Using the solid catalyst component prepared in Example 1, polymerization was performed in the same way as in Example 1 except that in place of 1.4 mmole of phenyltriethoxysilane there was used 0.49 g. of a reaction product of triethylaluminum and phenyltriethoxysilane (triethylaluminum/ phenyltriethoxysilane =1/0.33 (mole ratio)), results of which are as set out in Table 1.

TABLE 1

| | Solid Catalyst Component [I] | | | | | |
|---|---|---|---|---|---|---|
| | Component (1) | Component (2) | Component (3) | Component (4) | Component (5) | Amount of titanium supported |
| Example 2 | MgCl$_2$ | CH$_2$=CHSi(OC$_2$H$_5$)$_3$ | Phenol | Isobutyl ether | TiCl$_4$ | 22 mg |
| Example 3 | " | " | " | Isoamyl ether | " | 25 |
| Example 4 | " | " | " | Ethyl butyl ether | " | 19 |
| Example 5 | " | " | " | Ethyl isoamyl ether | " | 22 |
| Example 6 | " | " | " | Allyl ether | " | 27 |
| Example 7 | " | " | " | Ethyl allyl ether | " | 28 |
| Example 8 | " | " | " | Phenetole | " | 19 |
| Example 9 | " | " | " | Benzyl ether | " | 23 |
| Example 10 | " | " | " | 1-naphthyl ether | " | 20 |
| Example 11 | " | " | 1-naphthol | Phenyl ether | " | 19 |
| Example 12 | " | " | Phenol | Phenol ether | " | 24 |
| Example 13 | Solid Catalyst component of Example 1 | | | | | |

| | Component [II] | Component [III] | Polypropylene Yield | Catalytic Activity *1 | *2 | Total II wt % | MFI | Bulk Density g/cm$^3$ |
|---|---|---|---|---|---|---|---|---|
| Example 2 | Al(C$_2$H$_5$)$_3$ | C$_6$H$_5$Si(OC$_2$H$_5$)$_3$ | 85 g | 708 | 32.2 | 92.4 | 7.5 | 0.36 |
| Example 3 | " | " | 115 | 958 | 38.3 | 95.9 | 7.6 | 0.40 |
| Example 4 | " | " | 96 | 800 | 42.1 | 94.8 | 8.3 | 0.38 |
| Example 5 | " | " | 95 | 792 | 36.0 | 96.1 | 8.0 | 0.37 |
| Example | " | " | 103 | 858 | 31.7 | 94.1 | 8.1 | 0.37 |

TABLE 1-continued

| | | | | | | | | |
|---|---|---|---|---|---|---|---|---|
| Example 6 | " | " | 88 | 733 | 26.2 | 93.8 | 6.9 | 0.36 |
| Example 7 | " | " | 106 | 883 | 46.5 | 96.8 | 7.9 | 0.39 |
| Example 8 | " | " | 119 | 992 | 43.1 | 97.5 | 8.0 | 0.42 |
| Example 9 | " | " | 110 | 916 | 45.8 | 96.2 | 8.1 | 0.40 |
| Example 10 | " | " | 121 | 1008 | 53.0 | 97.7 | 7.0 | 0.41 |
| Example 11 | " | " | 115 | 933 | 38.9 | 97.3 | 8.2 | 0.39 |
| Example 12 | " | " | 119 | 992 | 47.2 | 97.2 | 8.1 | 0.41 |
| Example 13 | " | Reaction product of $Al(C_2H_5)_3$ and $C_6H_5Si(OC_2H_5)_3$ | | | | | | |

*1 unit: g. polypropylene/g. solid · hr · $C_3H_6$ pressure
*2 unit: kg. polypropylene/g. Ti · hr · $C_3H_6$ pressure

EXAMPLE 14

Solid catalyst components were prepared in the same way as in Example 1-(a) except that the amounts of the components were changed as shown in Table 2. Then, using these solid catalysts components, polymerization of propylene was performed in the same manner as in Example 1-(b), results of which are as set out in Table 2.

TABLE 2

| | Solid Catalyst Component [I] | | | | | |
|---|---|---|---|---|---|---|
| Run No. | Component (1) (mmole) | Component (2) (mmole) | Component (3) (mmole) | Component (4) (mmole) | Component (5) (mmole) | Amount of titanium supported |
| 1 | $MgCl_2$ (105) | $CH_2=CHSi(OC_2H_5)_3$ (11) | Phenol (11) | Phenyl ether (11) | $TiCl_4$ | 21 mg |
| 2 | $MgCl_2$ (105) | $CH_2=CHSi(OC_2H_5)_3$ (11) | Phenol (32) | Phenyl ether (21) | " | 32 |
| 3 | $MgCl_2$ (105) | $CH_2=CHSi(OC_2H_5)_3$ (53) | Phenol (11) | Phenyl ether (11) | " | 24 |
| 4 | $MgCl_2$ (105) | $CH_2=CHSi(OEt)_3$ (80) | Phenol (90) | Phenyl ether (19) | " | 26 |
| 5 | $MgCl_2$ (105) | $CH_2=CHSi(OEt)_3$ (1) | Phenol (1) | Phenyl ether (1.2) | " | 12 |

| Run No. | Component [II] | Component [III] | Polypropylene Yield | Catalytic Activity *1 | *2 | Total II wt % | MFI | Bulk Density g/cm³ |
|---|---|---|---|---|---|---|---|---|
| 1 | $Al(C_2H_5)_3$ | $C_6H_5Si(OC_2H_5)_3$ | 83 g | 692 | 32.9 | 97.4 | 7.7 | 0.37 |
| 2 | " | " | 124 | 1030 | 32.3 | 96.9 | 8.2 | 0.40 |
| 3 | " | " | 79 | 658 | 27.4 | 96.1 | 7.4 | 0.37 |
| 4 | " | $\phi Si(OEt)_3$ | 101 | 840 | 32.3 | 97.0 | 7.1 | 0.44 |
| 5 | " | " | 38 | 320 | 26.7 | 87.3 | 8.4 | 0.36 |

*1 unit: g. polypropylene/g. solid · hr · $C_3H_6$ pressure
*2 unit: kg. polypropylene/g. Ti · hr · $C_3H_6$ pressure

What is claimed is:

1. A process for preparing a polyolefin by polymerizing at least one α-olefin in the presence of a catalyst, which catalyst consists of the combination of:
    [I] a solid catalyst component consisting of a solid material obtained by co-pulverization of the following components (1) to (4), and titanium tetrachloride (5) supported on said solid material:
       (1) a magnesium dihalide,
       (2) a member selected from the group consisting of vinyltrimethoxysilane, vinyltriethyoxysilane, vinyltriphenoxysilane, allyltrimethoxy silane, allyltriethoxysilane and allyltriphenoxysilane,
       (3) a compound selected from the group consisting of phenol and 1-naphthol, and
       (4) a member selected from the group consisting of anisole, phenetole, phenyl ether, benzyl phenyl benzyl ether, 1-naphthyl ether and 2-naphthyl ether;
    [II] an organoaluminum compound; and
    ]III] monophenyltriethoxysilane;
    wherein the component (1) to component (2) mole ratio is in the range of from 1 to 0.01 to 1 to 1;
    the component (1) to component (3) is in the range of from 1 to 0.01 to 1 to 1;
    the component (1) to component (4) is in the range of from 1 to 0.01 to 0.25;
    the component [III] is used in an amount of 0.01 to 2 moles per mole of said organoaluminum compound;
    said α-olefin has 3 to 8 carbon atoms; and
    the polymerization reaction is carried out at a temperature in the range of 20° to 200° C. and at a pressure in the range of atmospheric pressure to 70 kg/cm².G.

2. The process of claim 1, wherein a reaction product of said organoaluminum compound and said component [III] is combined with said solid catalyst component [I].

3. The process of claim 1 wherein the amount of titanium tetrachloride is in the range of 1 to 10% by weight.

* * * * *